United States Patent
Le Nir et al.

(10) Patent No.: US 7,920,638 B2
(45) Date of Patent: Apr. 5, 2011

(54) METHOD FOR THE MULTIPLE-ANTENNA TRANSMISSION OF A SIGNAL BY SPACE-TIME BLOCK CODES, CORRESPONDING RECEPTION METHOD AND SIGNAL

(75) Inventors: Vincent Le Nir, Flers (FR); Maryline Helard, Rennes (FR)

(73) Assignee: France Telecom, Paris (FR)

( * ) Notice: Subject to any disclaimer, the term of this patent is extended or adjusted under 35 U.S.C. 154(b) by 1357 days.

(21) Appl. No.: 10/516,714

(22) PCT Filed: Sep. 27, 2004

(86) PCT No.: PCT/FR2004/002444
§ 371 (c)(1),
(2), (4) Date: Feb. 6, 2006

(87) PCT Pub. No.: WO2005/034386
PCT Pub. Date: Apr. 14, 2005

(65) Prior Publication Data
US 2006/0233274 A1    Oct. 19, 2006

(30) Foreign Application Priority Data
Oct. 3, 2003 (FR) ..................................... 03 11647

(51) Int. Cl.
*H04L 1/02* (2006.01)
(52) U.S. Cl. ........ 375/267; 375/146; 375/147; 375/260; 375/295; 375/299; 375/316; 375/340; 375/347; 455/101; 455/132; 455/296; 455/500; 370/334
(58) Field of Classification Search ................... 375/146, 375/147, 260, 267, 295, 299, 316, 340, 347; 455/101, 132, 296, 500; 370/334
See application file for complete search history.

(56) References Cited

U.S. PATENT DOCUMENTS

| | | | | |
|---|---|---|---|---|
| 6,307,882 B1 * | 10/2001 | Marzetta | | 375/224 |
| 6,363,121 B1 * | 3/2002 | Hochwald et al. | | 375/260 |
| 6,865,237 B1 * | 3/2005 | Boariu et al. | | 375/295 |

(Continued)

FOREIGN PATENT DOCUMENTS

DE    101 15 261 A1    10/2002

(Continued)

OTHER PUBLICATIONS

Bertrand M. Hochwald et al. "Unitary Space-Time Modulation for Multiple-Antenna Communications in Rayleigh Flat Fading" IEEE 2000.*

(Continued)

*Primary Examiner* — David C Payne
*Assistant Examiner* — Leon Flores
(74) *Attorney, Agent, or Firm* — David D. Brush; Westman, Champlin & Kelly, P.A.

(57) ABSTRACT

An embodiment of the invention relates to a method for sending a signal formed by successive vectors each comprising N symbols to be sent, and implementing at least two transmitter antennas. A distinct sub-matrix is associated with each of said antennas, said sub-matrices being obtained by subdivision of a unitary square matrix, and each of said antennas sends sub-vectors, obtained by subdivision of said vectors, respectively multiplied by said sub-matrices so as to form, as seen from a receiver, a single combined signal representing the multiplication of said vectors by said unitary matrix.

9 Claims, 5 Drawing Sheets

U.S. PATENT DOCUMENTS

| | | | |
|---|---|---|---|
| 6,873,606 B2 * | 3/2005 | Agrawal et al. | 370/310 |
| 7,263,132 B2 * | 8/2007 | Horng et al. | 375/267 |
| 7,266,157 B2 * | 9/2007 | Sim et al. | 375/267 |
| 7,269,224 B2 * | 9/2007 | Stuber et al. | 375/260 |
| 7,436,896 B2 * | 10/2008 | Hottinen et al. | 375/267 |
| 2002/0163892 A1 | 11/2002 | Hassibi et al. | 370/310 |
| 2002/0196842 A1 * | 12/2002 | Onggosanusi et al. | 375/148 |
| 2004/0179467 A1 | 9/2004 | Seeger et al. | 370/203 |

FOREIGN PATENT DOCUMENTS

| | | |
|---|---|---|
| EP | 1 009 124 A2 | 6/2000 |
| EP | 1073212 A2 | 1/2001 |

OTHER PUBLICATIONS

Xue-Bin Liang et al. "Unitary Signal Constellations for Differential Space-Time Modulation with Two Transmit Antennas: Parametric Codes, Optimal Designs, and Bounds" IEEE 2002.*

Maryline Helard et al. "Reduced-Complexity Space-Time Block Coding and Decoding Schemes with Block Linear Precoding" Electronic Letters Jul. 2003.*

Kai-Kit Wong "A Joint-Channel Diagonalization for Multiuser MIMO Antenna Systems" IEEE 2003.*

English translation of the International Preliminary Report on Patentability for counterpart foreign application No. PCT/FR2004/002444 filed Sep. 27, 2004.

S.M. Alamouti, "A Simple Transmit Diversity Technique for Wireless Communications", IEEE Journal on Select Areas in Communications, vol. 16, No. 8, Oct. 1998, pp. 1451-1458.

M.O. Damen et al., "Diagonal Alegebraic Space-Time Block Codes", IEEE Transactions on Information Theory, vol. 48, No. 3, Mar. 2002, pp. 628-636.

V. Tarokh, "Space-Time Block Codes from Orthogonal Designs", IEEE Transactions on Information Theory, vol. 45, No. 5, Jul. 1999, pp. 1456-1467.

Yan Xin et al., "Space-Time Constellation-Rotating Codes Maximizing Diversity and Coding Gains", 2001, pp. 455-459.

H. Jafarkhani, "A Quasi-Orthogonal Space-Time Block Code", IEEE Transactions on Communications, vol. 49, No. 1, Jan. 2001, pp. 1-4.

* cited by examiner

METHOD FOR THE MULTIPLE-ANTENNA TRANSMISSION OF A SIGNAL BY SPACE-TIME BLOCK CODES, CORRESPONDING RECEPTION METHOD AND SIGNAL

CROSS-REFERENCE TO RELATED APPLICATION

This Application is a Section 371 National Stage Application of International Application No. PCT/FR04/02444, filed Sep. 27, 2004, not in English.

FIELD OF THE INVENTION

The field of the invention is that of wireless digital communications. More specifically, the invention relates to the sending/receiving of a signal using a new type of space-time block code in the context of a MIMO ("Multiple Input Multiple Output") or MISO ("Multiple Input Single Output") type multiple-antenna system.

The invention can thus be applied especially to transmission systems implementing a plurality of antennas (at least two of them) at sending and/or at reception. The invention is therefore well suited to receivers for non-orthogonal space-time codes with Nt transmitter antennas and Nr receiver antennas.

The invention can be applied in the field of radio communications, especially for systems of the third, fourth and following generations.

BACKGROUND OF THE INVENTION

There already exist several known sending/receiving systems comprising several transmitter antennas and using space-time codes. The earliest systems proposed all used orthogonal space-time block codes.

Thus, Alamouti in "A Simple Transmit Diversity Technique for Wireless Communications", IEEE J. Sel. Areas Comm., 1998, 16, (8), pp. 1451-1458, presented the first system using a rate-one orthogonal space-time block code (where rate is defined as the ratio between the number N of symbols sent and the number L of symbol times or periods during which they are sent), for two transmitter antennas.

Tarokh et al. ("Space-time block codes from orthogonal designs", IEEE Trans. on Information Theory, 1999, 45, (5), pp. 1456-1467) then generalized the orthogonal space-time block codes to systems comprising three or four transmitter antennas. However the rate values R=N/L obtained were only rate ½ or rate ¾.

The next studies led to envisaging the use of non-orthogonal space-time block codes. Thus Jafarkhani ("A Quasi-Orthogonal Space-Time Block Code", IEEE Trans. Comm., 2001, 49, (1), pp 1-4) and Tirkonnen et al. ("Minimal non-orthogonality rate one space-time block code for 3+ Tx antennas", ISSSTA, 2000, pp 429-432) have found rate-one non-orthogonal space-time block codes for a four-antenna system.

Subsequently, Damen et al. ("Diagonal Algebraic Space-Time Block Codes", IEEE Trans. Inf. Theory, 2002, 48, (3), pp 628-626) envisaged the use of non-orthogonal space-time codes based on a Hadamard construction and other rotations with a number of transmitter antennas equal to the size of the code matrix.

Xin et al., in "Time Constellation-Rotating Codes Maximizing Diversity and Coding Gains", GLOBECOM, San Antonio, 2001, pp 455-459, subsequently presented other rotation-based space-time codes.

One drawback of Alamouti's or Tarokh's orthogonal space-time codes is that they require the channels to be constant for the duration L, corresponding to the number of symbol periods during which the symbols are sent.

Such codes therefore place heavy constraints on the sending/receiving systems, and cannot be used to exploit the diversity of the channel.

One drawback of the non-orthogonal space-time codes proposed by Jafarkhani, Tirkonnen, Damen or Xin is that they require the channel to be constant for a period L=Nt, where Nt is the number of antennas at transmission. This is particularly true for the Damen and Xin codes.

In other words, a major drawback of all the space-time codes proposed in the literature is that they require the solution to be placed in the context of a quasi-static channel. This is particularly restrictive and does not permit the diversity of the channels to be exploited.

Furthermore, the Jafarkhani and Tirkonnen codes dictate a maximum likelihood (ML) decoding whose complexity increases exponentially with the order of modulation and the code size.

Finally, another drawback of the Damen algebraic space-time codes, which rely on a Hadamard construction, is that they have to be sent in a particular matrix form. They therefore cannot be used to obtain a choice of encoding that is flexible according to the variations of the channel.

SUMMARY OF THE INVENTION

It is a goal of the invention especially to mitigate these drawbacks of the prior art.

More specifically, it is a goal of the invention to provide a signal-sending technique that implements space-time codes with improved performance as compared with prior art space-time codes.

It is yet another goal of the invention to implement a technique of this kind that lays down no special conditions as regards the non-variation of the channel over a finite duration or given number of symbol periods.

It is yet another goal of the invention to provide a technique of this kind that is adapted to MIMO and MISO type antenna systems. More particularly, it is a goal of the invention to provide a technique of this kind that gives a constant encoding rate of one, whatever the number of antennas.

It is also a goal of the invention to implement a technique of this kind whose binary error rate performance at high signal-to-noise ratios is superior to that of the prior art.

It is yet another goal of the invention to provide a technique of this kind that can be easily adapted to different types of configuration, such as an increase in the number of antennas or the size of the code used.

It is yet another goal of the invention to implement a technique of this kind enabling channel diversity to be better exploited than in prior art techniques and enabling flexible encoding.

These goals, as well as others there should appear here below, are achieved by means of a method for sending a signal formed by successive vectors each comprising N symbols to be sent, and implementing at least two transmitter antennas.

According to an embodiment of the invention, a distinct sub-matrix is associated with each of said antennas, said sub-matrices being obtained by subdivision of a unitary square matrix, and each of said antennas sends sub-vectors, obtained by subdivision of said vectors, respectively multiplied by said sub-matrices, so as to form, as seen from a receiver, a single combined signal representing the multiplication of said vectors by said unitary matrix.

Thus, an embodiment of the invention relies on a wholly novel and inventive approach to the sending of a signal implementing a space-time code in a multiple-antenna system. The technique of the invention is particularly advantageous since it imposes no conditions on the channel: unlike the prior art techniques, the proposed encoding does not require the channel to be constant for the duration of the code.

The particular building of space-time codes proposed by an embodiment of the invention is totally novel, and relies on an orthogonal or unitary matrix construction for each antenna. Indeed, the use of these matrices enables a separation of the signals sent by each antenna.

In an embodiment of the invention, therefore, the system constraints are less limited than with the techniques of the prior art, and the channel diversity can be better exploited. The binary error rate performance values obtained at high signal-to-noise ratios are superior to those given in the literature.

Furthermore, the method of the invention can very easily be extended to a larger number of antennas because it can be obtained directly by means of the basic unitary or orthogonal matrix. Whatever the number of antennas used, the encoding rate remains constant.

Advantageously, with such a sending method implementing Nt antennas, each of said sub-matrices has a size of (N/Nt)×N.

The method of the invention can indeed be easily adapted to different configurations, especially to an increase in the number Nt of antennas. The different matrices sized (N/Nt)×N are obtained from a main matrix sized N×N that is subdivided into Nt different matrices.

Preferably, N/Nt is greater than or equal to 2.

Advantageously, said unitary matrix is full. In other words, each of the elements of the matrix is non-zero.

Preferably, said unitary matrix belongs to the group comprising:
the real Hadamard matrices;
the complex Hadamard matrices;
the Fourier matrices;
the real rotation matrices;
the complex rotation matrices.

The different matrices bear no relation with one another. However, they all have the common characteristic of being either orthogonal in the case of a real matrix, or unitary in the case of a complex matrix.

According to a first advantageous variant of the invention, such a method implements two transmitter antennas, and said sub-matrices are equal to [1 1] and [1 −1].

According to a second advantageous variant of the invention, such a method implements two transmitter antennas and said sub-matrices have a value of $$\frac{1}{\sqrt{2}}\begin{bmatrix} 1 & 1 & 1 & 1 \\ 1 & -1 & 1 & -1 \end{bmatrix} \text{ and } \frac{1}{\sqrt{2}}\begin{bmatrix} 1 & 1 & -1 & -1 \\ 1 & -1 & -1 & 1 \end{bmatrix}.$$

In this preferred embodiment of the invention, therefore, several codes are used for each user; in other words, for each user, each sub-matrix has at least two rows.

According a third advantageous variant of the invention, such a method implements four transmitter antennas and said sub-matrices have a value of [1 1 1 1], [1 −1 1 −1], [1 1 −1 −1] and [1 −1 −1 1].

The invention also relates to a method for the reception of a signal sent according to the sending method described here above, implementing at least one receiver antenna, that receives said single combined signal on each of said receiver antennas, and decodes said single combined signal by means of the decoding matrix corresponding to a conjugate transpose matrix of said unitary matrix.

Preferably, a maximum likelihood decoding is applied to the data coming from the multiplication by said conjugate transpose matrix.

It is also possible to use other less complex decoders, and thus achieve a sphere decoding or a QR decomposition decoding for example. It may be recalled that any hermitian matrix may indeed be decomposed in the form QR, where Q is a unitary matrix and R is an upper triangular matrix. A QR decomposition of this kind has a $O^3$ complexity, which is therefore lower than the maximum likelihood decoding which has an $O^L$ complexity.

The invention therefore relates to a signal sent according to the transmission method described here above, corresponding to the combination of the contributions of each of said transmitter antennas, a distinct sub-matrix being associated with each of said antennas, said sub-matrices being obtained by subdivision of a unitary square matrix. Each of said antennas sends sub-vectors, obtained by subdivision of said vectors, respectively multiplied by said sub-matrices. Seen from a receiver, such a signal forms a single combined signal representing the multiplication of said vectors by said unitary matrix.

BRIEF DESCRIPTION OF THE DRAWINGS

Other features and advantages of the invention shall appear more clearly from the following description of a preferred embodiment, given by way of a simple illustrative and non-exhaustive example and from the appended drawings, of which.

DETAILED DESCRIPTION OF THE ILLUSTRATIVE EMBODIMENTS

The general principle of the invention relies on a novel type of space-time code for a multiple-antenna system. The particular building of these codes relies on an orthogonal or unitary matrix construction for each transmitter antenna, the use of these matrices enabling a separation of the signals sent by each antenna.

Figure 1:
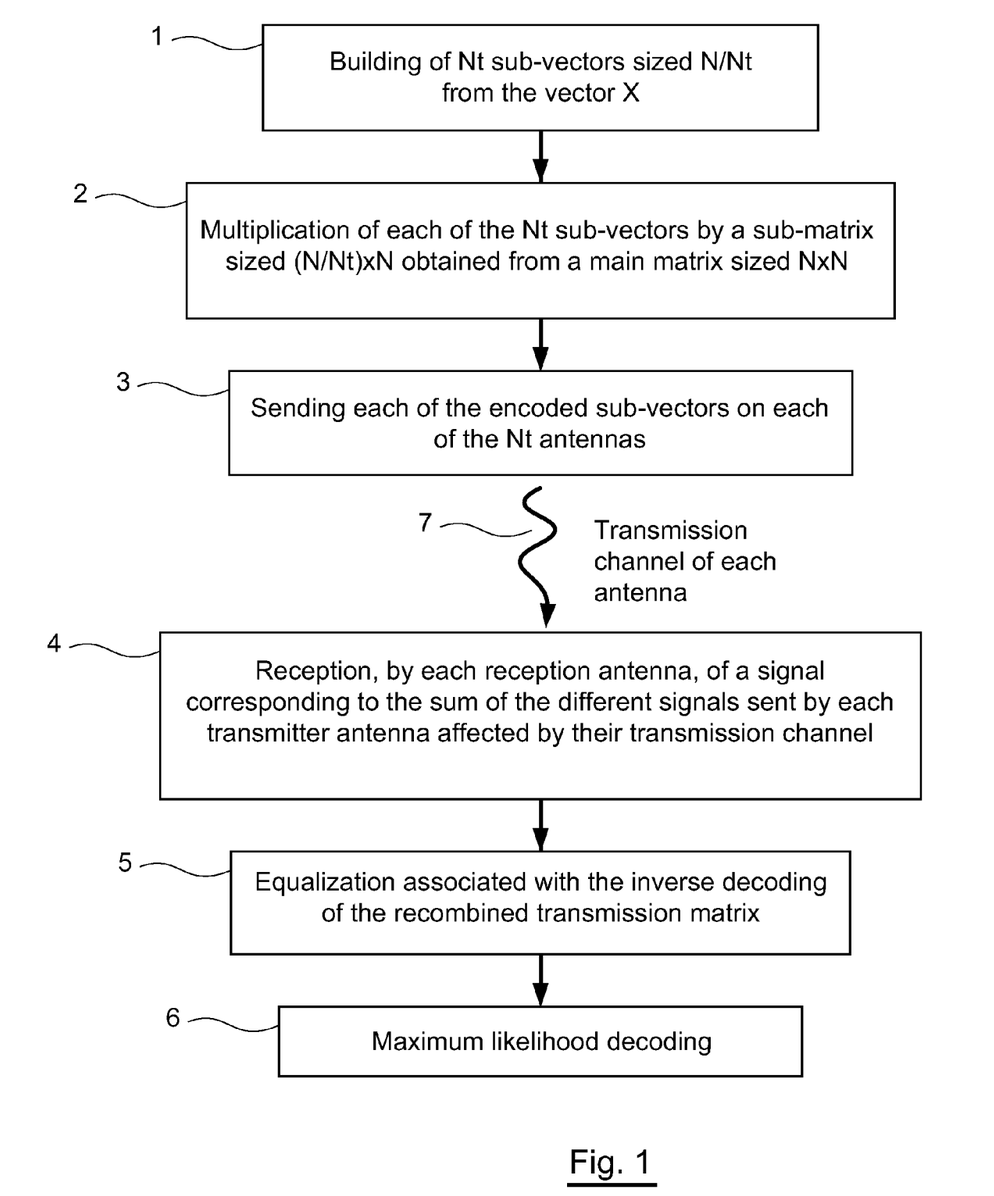
FIG. 1 is a flow chart showing the different steps implemented in transmission and in reception for a signal encoded by means of the space-time codes of the invention.

FIG. 1 presents the different steps implemented during the sending and reception of a signal according to the invention.

At encoding, X is considered to be a vector sized N containing the N symbols to be sent. A system comprising a number Nt of transmitter antennas is also considered. The novel space-time codes proposed by the invention are conceived as follow:

In a first step 1, the vector X containing the symbols to be sent is divided into Nt sub-vectors sized N/Nt.

Then, in a step 2, each of the sub-vectors sized N/Nt is multiplied by a different matrix sized (N/Nt)×N. These matrices are obtained from a real Hadamard matrix, a complex Hadamard or Fourier matrix, as well as from any real or complex rotation matrix. Although they have no relationship with one another, these different matrices have common characteristics. Indeed, each of these matrices is either orthogonal if it is a real matrix or unitary if it is a complex matrix.

Furthermore, each of these matrices has to be full, i.e. each of these elements has to be non-zero. Thus, the different matrices sized (N/Nt)×N are obtained from a main matrix sized N×N which is subdivided into Nt different matrices.

Then, in the step 3, the different sub-vectors encoded on each of the Nt antennas are sent. For each symbol period, each of the transmission channels existing between the different transmission and receiver antennas affects (7) the transmitted signal.

The signal received by each receiver antenna during the step referenced 4 corresponds to the sum of the different signals sent by each antenna, affected by their own channel at a given point in time.

At decoding, an equalization step 5 is performed. This step is associated with the reverse decoding of the recombined transmission matrix. This matrix is the conjugate transpose of the transmission matrix sized N×N. The elements of this conjugate transpose are the equalization filters of the channels between the transmitter and receiver antennas for the duration of the code N.

Then, a maximum likelihood decoding step 6 is performed. The decoder used may also be less complex, so as to carry out, for example, a sphere decoding or a QR decomposition decoding. This decoding step 6 is performed by computing the distance between the Euclidean signal received during the step 4 and all the signals that could have been transmitted from the transmitter antennas. Thus, a received noiseless fictitious signal that could have been received is reshaped and compared directly with the real received signal which had been noisy during its passage 7 through the transmission channel. This decoding therefore demands an effort of adaptation to the encoding made and will be different for each space-time encoder used. In the case of maximum likelihood decoding, if M corresponds to the alphabet of the modulation and N is the size of the matrix used, then an exhaustive search has to be made for the signal sent by performing $M^N$ comparisons: this is costly in terms of complexity, whence the utility of using other less complex methods of decoding.

The different steps of the flow chart of FIG. 1 are illustrated by the example here below.

A vector X sized 10 is chosen, along with a number of antennas Nt=2.

During the step referenced 1, the vector X is divided into Nt sub-vectors sized N/Nt, so as to obtain two sub-vectors sized 5.

During the step referenced 2, each of the sub-vectors sized 5 is multiplied by a different matrix. A known matrix sized 10×10 is the Fourier matrix. This matrix sized 10×10 is divided into two matrices sized 5×10. Therefore, each of the sub-vectors sized 5 is multiplied by one of the two matrices 5×10. After this operation, the two sub-vectors corresponding to the two antennas corresponds to the space-time code used for sending.

During the step referenced 3, the two different sub-vectors encoded on each of the two transmitter antennas are sent.

After propagation 7 via the transmission channel and reception 4, an equalization step 5 is performed at decoding. This equalization step 5 is associated with the reverse decoding of the recombined transmission matrix. This matrix is the conjugate transpose of the 10×10 transmission Fourier matrix.

In a step referenced 6, a maximum resemblance decoding, or a less complex decoding of the sphere type, or a QR decomposition decoding is performed. With a maximum likelihood decoding, if M corresponds to the modulation alphabet, an exhaustive search has to be made for the signal sent by performing $M^{10}$ comparisons.

Figure 2:
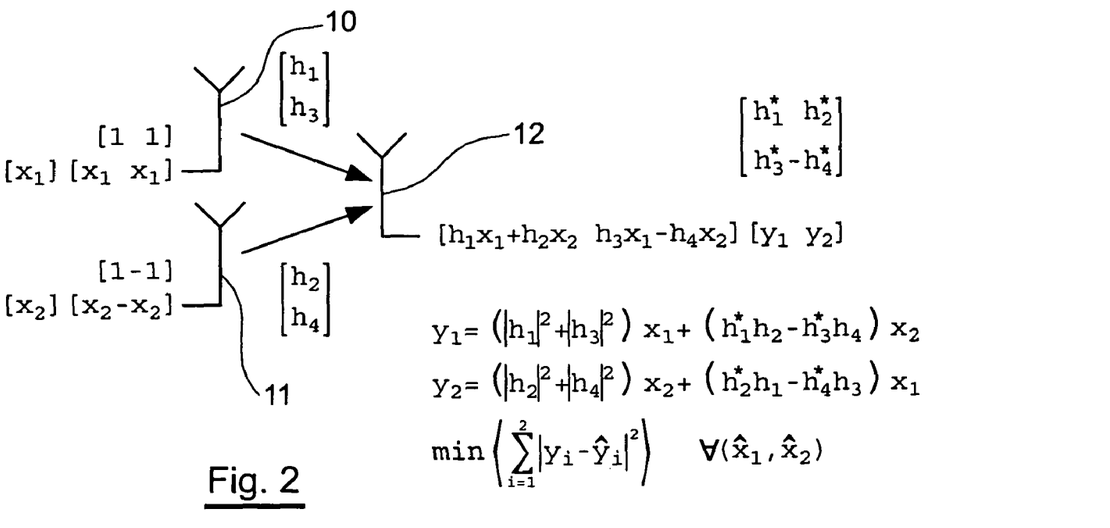
FIG. 2 illustrates a two-antenna system implementing a 2×2 matrix space-time code according to the invention.

Referring now to FIG. 2, an embodiment of the invention is presented in the case of a two-antenna (10, 11) transmission system using 2×2 matrix space-time codes.

This FIG. 2 illustrates the transmission system of the invention with Hadamard code sequences with a length 2 per antenna. This code has an encoding rate of ½ or a space-time encoding rate of 1 if the rate R is considered to be equal to the number of symbols N divided by the number of symbol periods L during which they are sent.

In FIG. 2, $x_1$, $x_2$ represent the symbols to be transmitted, $h_1$, $h_2$, $h_3$, $h_4$ are, for example, flat Rayleigh propagation channels, associated with the two transmitter antennas 10, 11 and $y_1$ and $y_2$ are the equalized symbols retrieved during the step referenced 5 of FIG. 1.

After multiplication of the sub-vector by the sub-matrix [1 1] associated with the transmitter antenna 10, this antenna sends the sub-vector $[x_1 \ x_1]$. Similarly, the transmitter antenna 11 sends the sub-vector $[x_2 \ -x_2]$, obtained by multiplication of $[x_2]$ by the sub-matrix [1 -1].

In considering an adapted interleaving and a decorrelation between the antennas, the channel varies at every symbol period. At reception, the contribution of the first antenna 10 as well as that of the second antenna 11 affected by the corresponding channel is received at the receiver antenna 12: this contribution is written in matrix form: $[h_1 x_1 + h_2 x_2 \ h_3 x_1 - h_4 x_2]$. A decoding and equalization step then consists in applying the transconjugate $$\begin{bmatrix} h_1^* & h_2^* \\ h_3^* & -h_4^* \end{bmatrix}$$

of the transmitted unitary matrix, while the same time performing an equalization. Consequently, the different channels having contributed to the sending step are considered. An ML (or maximum likelihood) decoding can then be performed. This decoding will seek the word that was most probably sent. To do this, the metric $$\min\left(\sum_{i=1}^{2} |y_i - \hat{y}_i|^2\right)$$

presented in FIG. 2 is computed for all the vectors $(\hat{x}_1, \hat{x}_2)$ possible, in order to determine the most probable code word sent.

Figure 3:
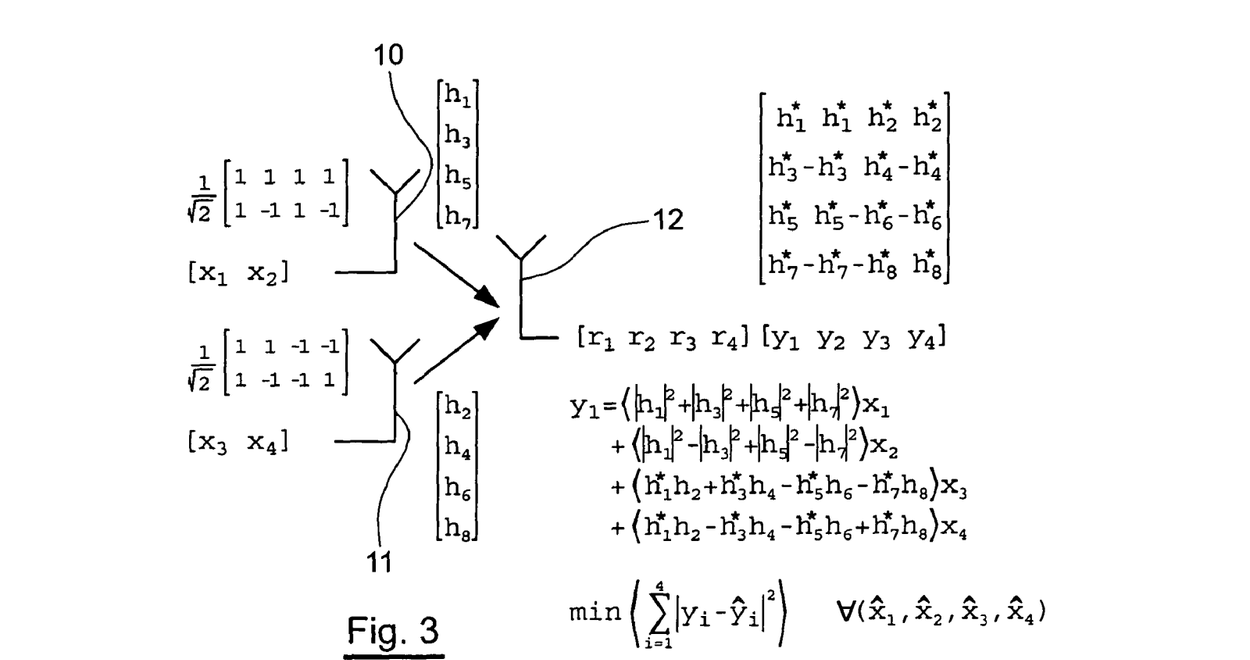
FIG. 3 illustrates a two-antenna system similar to that of FIG. 2 but implementing a 4×4 matrix space-time code.

FIG. 3 shows a two-antenna transmission system 10, 11 similar to that of FIG. 2, using 4×4 matrix space-time codes.

The system of FIG. 3 more specifically Hadamard code sequences with a length 4 per antenna. It is possible to consider increasing the size of the Hadamard matrices and thus obtain codes with a length L for two antennas.

Again, $x_1$, $x_2$, $x_3$, $x_4$ are the symbols to be transmitted and $h_1$, $h_2$, $h_3$, $h_4$, $h_5$, $h_6$, $h_7$, $h_8$ are the flat Rayleigh propagation channels associated with the two transmitter antennas 10, 11. The odd-number indices referring to the first transmitter antenna 10, and the even-number indices referring to the second antenna 11. $y_1$, $y_2$, $y_3$, $y_4$ are the equalized symbols retrieved at the receiver antenna 12 at the end of the step 5 of FIG. 1.

The transmitter antenna 10 sends the sub-vector obtained by multiplication of the sub-vector [$x_1$ $x_2$] by the $$\text{sub-matrix } \frac{1}{\sqrt{2}} \begin{bmatrix} 1 & 1 & -1 & -1 \\ 1 & -1 & -1 & 1 \end{bmatrix}.$$

Similarly, the transmitter antenna 11 sends out the sub-vector, obtained by multiplication of [$x_3$ $x_4$] by the $$\text{sub-matrix } \frac{1}{\sqrt{2}} \begin{bmatrix} 1 & 1 & 1 & 1 \\ 1 & -1 & 1 & -1 \end{bmatrix}.$$

At reception, the contribution of the first antenna 10 as well as that of the second antenna 11 affected by the corresponding channel ([$r_1$ $r_2$ $r_3$ $r_4$]) are received at the receiver antenna 12. A step for the decoding and equalization of the received signal then consists in applying the transconjugate $$\begin{bmatrix} h_1^* & h_1^* & h_2^* & h_2^* \\ h_3^* & -h_3^* & h_4^* & -h_4^* \\ h_5^* & h_5^* & -h_6^* & -h_6^* \\ h_7^* & -h_7^* & -h_8^* & h_8^* \end{bmatrix}$$

of the transmission unitary matrix while at the same time performing an equalization.

Then, the metric $$\min\left(\sum_{i=1}^{4} |y_i - \hat{y}_i|^2\right)$$

presented in FIG. 3 for all the vectors ($\hat{x}_1, \hat{x}_2, \hat{x}_3, \hat{x}_4$) possible in order to have the most probable code word sent is computed.

Figure 4:
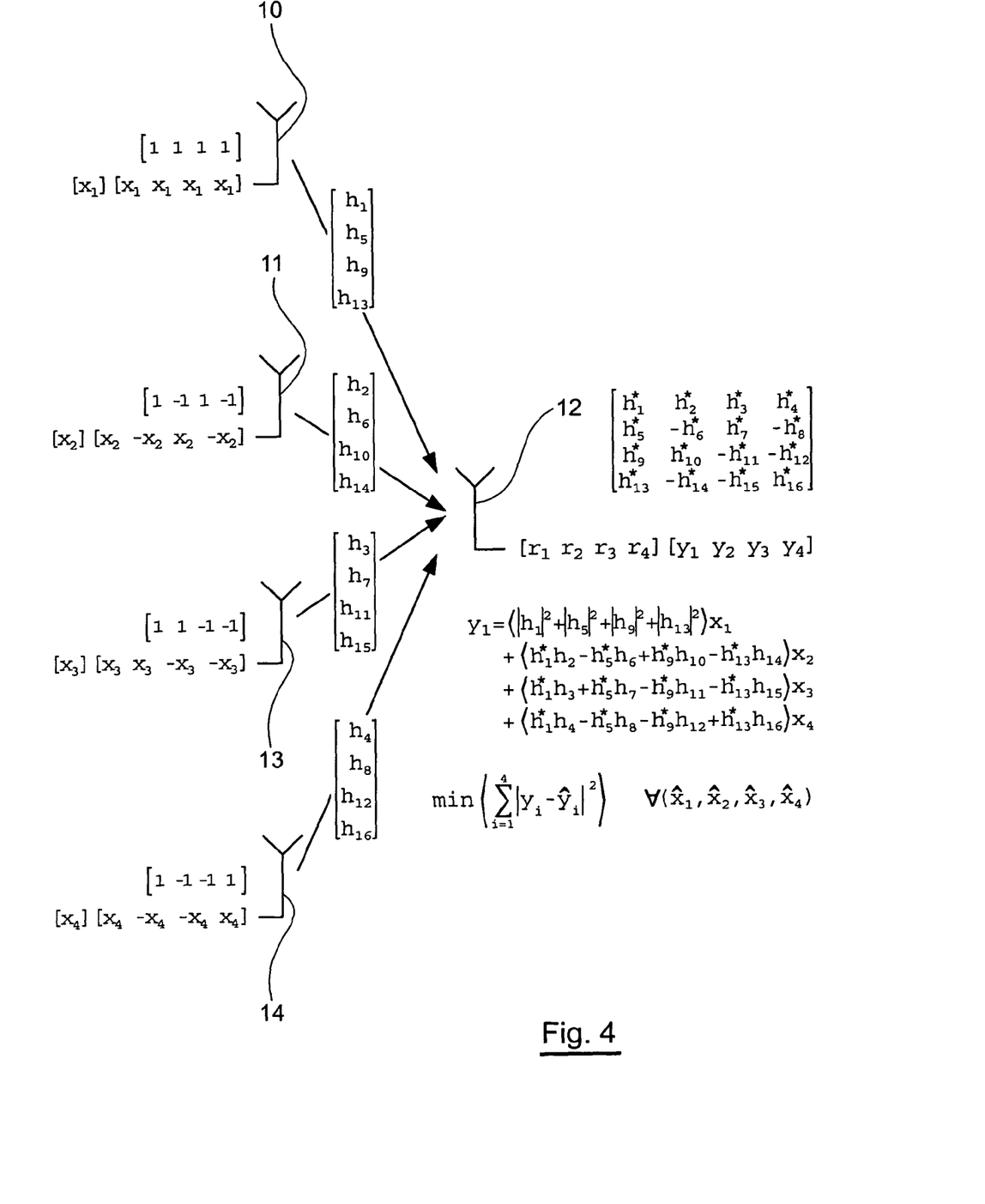
FIG. 4 describes a four-antenna system implementing a 4×4 matrix space-time code.

The system of the invention is not limited in terms of number of transmitter antennas. As illustrated in FIG. 4, it is possible to create space-time codes with four transmitter antennas 10, 11, 13 and 14 with a minimum matrix size L=4.

In FIG. 4, $x_1$, $x_2$, $x_3$, $x_4$ are the symbols to be transmitted. $h_1$, $h_2$, $h_3$, $h_4$, $h_5$, $h_6$, $h_7$, $h_8$, $h_9$, $h_{10}$, $h_{11}$, $h_{12}$, $h_{13}$, $h_{14}$, $h_{15}$, $h_{16}$ are the flat Rayleigh propagation channels, associated with each of the four antennas 10, 11, 13 and 14 as illustrated in FIG. 4 and $y_1$, $y_2$, $y_3$, $y_4$ are the symbols equalized after reception by the receiver antenna 12. Then the metric $$\min\left(\sum_{i=1}^{4} |y_i - \hat{y}_i|^2\right)$$

illustrated in FIG. 4 is computed for all the possible vectors ($\hat{x}_1, \hat{x}_2, \hat{x}_3, \hat{x}_4$) in order to determine the most probable code word sent.

The principle of the sending of the sub-vectors by each of the transmitter antennas is similar to the one presented here above with reference to FIGS. 10, 11, 13 and 14 and hence, for the sake of simplicity, it shall not be described in greater detail herein.

It will be noted that, in the examples illustrated here above with reference to FIGS. 2 to 4, the space-time codes considered had been created by using simple Hadamard matrices. However, it is possible to use any unitary, complex Hadamard or Fourier matrix. More generally, any unitary matrix can be used in the transmitter system of the invention.

Figure 5:
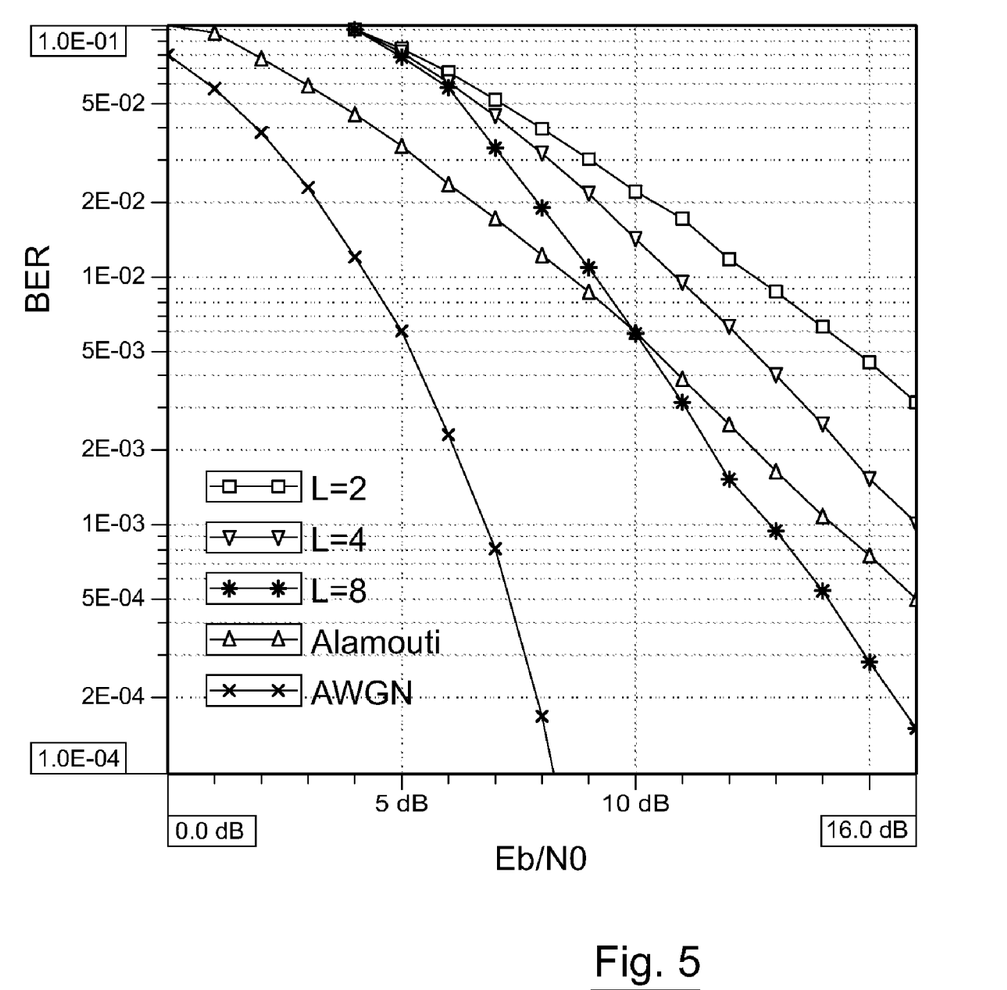
FIG. 5 presents the comparative performance values of the different rate 1 space-time codes, in the prior art and in the present invention, for two transmitter antennas and one receiver antenna.
Figure 6:
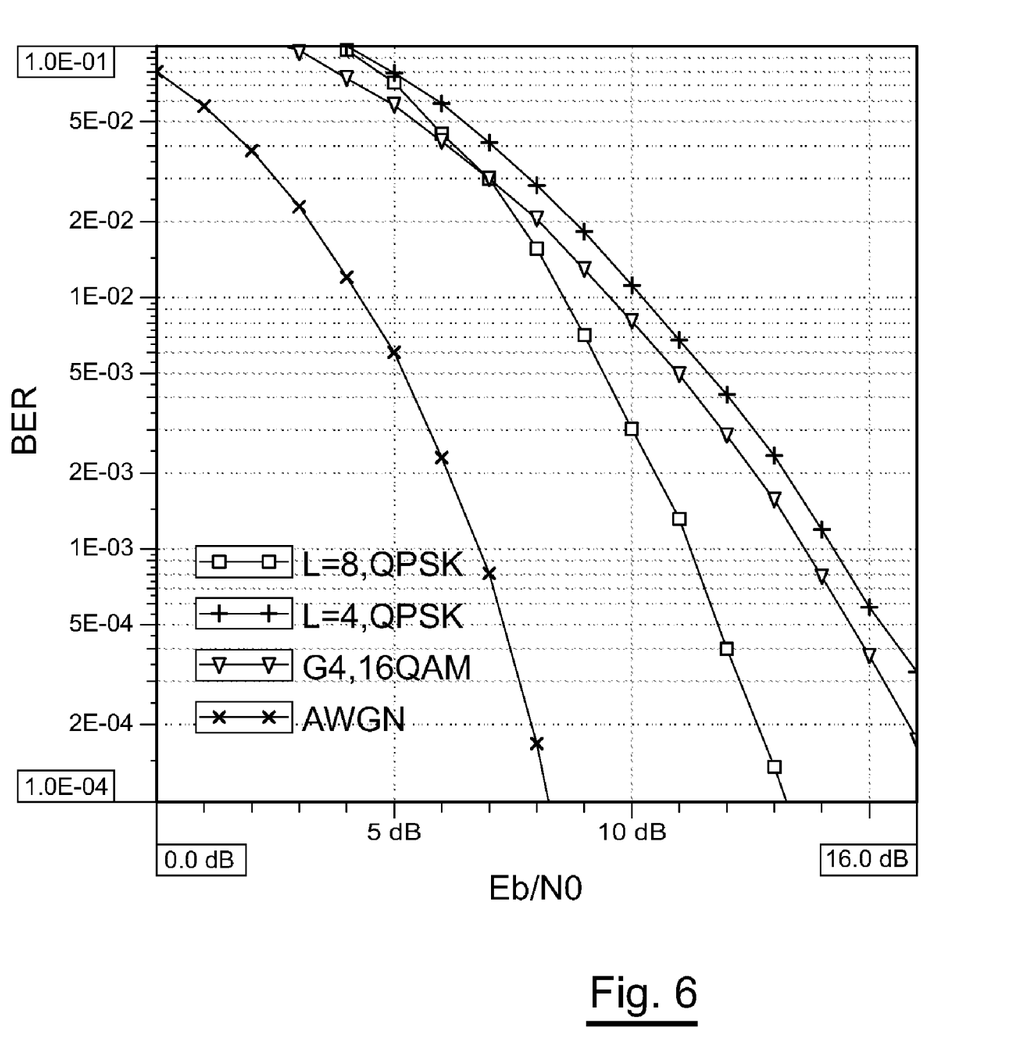
FIG. 6 presents the comparative performance values of the different rate 1 space-time codes, in the prior art and in the present invention, for four transmitter antennas and one receiver antenna.

FIGS. 5 and 6 present the performance values obtained, according to the invention, in decoding the space-time codes with an ML (maximum resemblance) decoder.

FIG. 5 illustrates the compared performance values of different rate-one space-time codes for 2 transmitter antennas and one receiver antenna in the context of a QPSK modulation. More specifically, FIG. 5 presents the performance of the space-time codes of the invention for an encoding matrix size L=2, L=4 and L=8, as well as the performance of the Alamouti code.

As shown in FIG. 5, the performance values of the codes of the invention are good at high signal-to-noise ratio, when the size of the encoding matrix L increases. Indeed, for two transmitter antennas and one receiver antenna, when an encoding matrix L=8 is taken, the performance values of the codes of the invention exceed the performance values of the reference curve of the Alamouti encoding ("A Simple Transmit Diversity Technique for Wireless Communications", IEEE J. Sel. Areas Comm., 1998, 16, (8), pp. 1451-1458) for a bit/energy noise ratio Eb/N0>10 dB.

More specifically, it can be realized that, the greater the increase in the size of the matrix of the codes, the more the signals are detected with a high order of channel diversity. This is expressed by the slope of the performance curves of FIG. 5: the more accentuated the slope, the greater the increase in the order of channel diversity so that it asymptotically attains a Gaussian relationship, illustrated by the curve AWGN of FIG. 5.

These results show that decoding operations less complex than maximum resemblance decoding can be implemented according to the invention, while keeping performance values that are more satisfactory than those of the prior art techniques.

It is thus possible to use a QR decoding corresponding to a DFE ("Digital Feedback Equalizer") or use a Viterbi decoding system. Another approach may use an "interference canceller". Indeed, if M is the size of the alphabet and if L is the size of the matrix of the codes, a maximum likelihood decoder must exhaustively compare $M^L$ words, which is particularly complex to implement.

FIG. 6 illustrates the comparative performance values of different rate-one space-time codes for 4 transmitter antennas and one receiver antenna, in the context of a QPSK modulation. More specifically, FIG. 6 shows the performance values of the space-time codes of the invention for a matrix encoding size L=4 and L=8 and a QPSK type modulation, as well as those of the Tarokh code G4 for a 16QAM modulation. The curve AWGN of FIG. 6 represents a Gaussian relationship associated with a white noise.

The difference between the space-time code of the invention with L=4 and the Tarokh G4 code ("Space-time block codes from orthogonal designs", IEEE Trans. on Information Theory, 1999, 45, (5), pp. 1456-1467) using a 16 QAM ("Quadrature amplitude Modulation") modulation is small and fairly big gains can be expected when L increases. Thus a fairly major gain is seen when L=8. The two curves are parallel because these two codes obtain the same order of diversity which is 4. The difference comes from an interference which is slightly greater in the case of the code of the invention for L=4. However, for L=8 it can be said as of now that the performance values of the codes of the invention will be higher than those of the Tarokh G4 code.

It is recalled that the technique of the invention can be applied to any multiple-antenna system, whether it is of the MIMO or the MISO type. The OFDM type modulations and the MC-CDMA systems are particularly well suited to the system proposed by the invention.

Although the present disclosure has been described with reference to one or more examples, workers skilled in the art will recognize that changes may be made in form and detail without departing from the scope of the disclosure and/or the appended claims.

The invention claimed is:

1. A method for sending a signal implemented by a system comprising Nt transmit antennas, with Nt≧2, wherein the method implements the following steps, for at least one vector comprising N symbols to be sent:
   dividing said vector into Nt sub-vectors, wherein the step of dividing is performed by the system;
   multiplying each of the Nt sub-vectors by a distinct sub-matrix sized (N/Nt,N), where N/Nt is an integer greater than or equal to 2, each sub-matrix being associated with one of the transmit antennas, and said sub-matrices being obtained by subdivision of a unitary square matrix sized (N,N), and wherein the step of multiplying is performed by the system; and
   sending the Nt sub-vectors resulting from the multiplying step, one from each of the Nt transmit antennas.

2. The method according to claim 1, wherein said unitary matrix is full.

3. The method according to claim 1, wherein said unitary matrix belongs to the group comprising:
   real Hadamard matrices;
   complex Hadamard matrices;
   Fourier matrices;
   real rotation matrices;
   complex rotation matrices.

4. The method according to claim 1, wherein the method implements two transmitter antennas and said sub-matrices have a value of [1 1] and [1 −1].

5. The method according to claim 1, wherein the method implements two transmitter antennas and said sub-matrices have a value of $$\frac{1}{\sqrt{2}}\begin{bmatrix} 1 & 1 & 1 & 1 \\ 1 & -1 & 1 & -1 \end{bmatrix} \text{ and } \frac{1}{\sqrt{2}}\begin{bmatrix} 1 & 1 & -1 & -1 \\ 1 & -1 & -1 & 1 \end{bmatrix}.$$

6. The method according to claim 1, wherein the method implements four transmitter antennas and said sub-matrices have a value of [1 1 1 1], [1 −1 1 −1], [1 1 −1 −1] and [1 −1 −1 1].

7. A method for reception of a signal corresponding to a combination of contributions of Nt transmit antennas, with Nt≧2, wherein for at least one vector comprising N symbols to be sent, the signal is generated by dividing said vector into Nt sub-vectors, multiplying each of the Nt sub-vectors by a distinct sub-matrix sized (N/Nt,N), where N/Nt is an integer greater than or equal to 2, each sub-matrix being associated with one of the transmit antennas, and said sub-matrices being obtained by subdivision of a unitary square matrix sized (N,N), and sending the Nt sub-vectors resulting from the multiplying step, one from each of the Nt transmit antennas, wherein the signal forms, seen from a receiver, a single combined signal representing the multiplication, wherein the method of reception comprises:
   implementing the method by a system comprising at least one receiver antenna;
   receiving said single combined signal on each of said receiver antennas by the system; and
   decoding said single combined signal by the system with a decoding matrix corresponding to a matrix that is the conjugate transpose of said unitary matrix.

8. The method according to claim 7, wherein a maximum likelihood decoding is applied to data coming from multiplication by said conjugate transpose matrix.

9. A method for sending a signal implemented by a system comprising two transmit antennas, wherein the method implements the following steps, for at least one vector comprising N symbols to be sent:
   dividing said vector into two sub-vectors, wherein the step of dividing is performed by the system;
   multiplying each of the two sub-vectors by a distinct sub-matrix sized (N/2,N), where N/2 is an integer, each sub-matrix being associated with one of the transmit antennas, and said sub-matrices being obtained by subdivision of a unitary square matrix sized (N,N) and having a value of $$\frac{1}{\sqrt{2}}\begin{bmatrix} 1 & 1 & 1 & 1 \\ 1 & -1 & 1 & -1 \end{bmatrix} \text{ and } \frac{1}{\sqrt{2}}\begin{bmatrix} 1 & 1 & -1 & -1 \\ 1 & -1 & -1 & 1 \end{bmatrix}$$

wherein the step of multiplying is performed by the system; and
   sending, from the two transmit antennas, the two sub-vectors resulting from the multiplying step.

* * * * *